Oct. 27, 1959     T. R. SILVERBERG     2,910,227

PRECISION LINKAGE FOR EXACT MULTIPLICATION

Filed Nov. 21, 1955

INVENTOR.
T. R. SILVERBERG

BY
Wade Koonty
Sherman H. Goldman
ATTORNEYS

United States Patent Office 2,910,227
Patented Oct. 27, 1959

2,910,227

PRECISION LINKAGE FOR EXACT MULTIPLICATION

Thomas R. Silverberg, West Concord, Mass., assignor to the United States of America as represented by the Secretary of the Air Force Application November 21, 1955, Serial No. 548,286

3 Claims. (Cl. 235—61)

This invention relates to linkage computers and more particularly to a precision linkage for exact multiplication which utilizes a modification of Scott Russell linkages in combination with pivots and slides.

An object of this invention is the production of a precision linkage for exact multiplication (as distinguished from approximate multiplication through the use of approximate linkages which have an inherent, theoretical error in their design) comprising an input slide, a rotating slide and a pair of modified Scott Russell linkages which act as a second input and the output, respectively.

A further object of the invention is the provision of a computer linkage which may be used as an element of a machine which performs further computations.

Another object of the invention is the provision of a computer linkage which attains a high degree of accuracy, operates smoothly, is easily constructed, and is inexpensive to produce.

Figure 1:
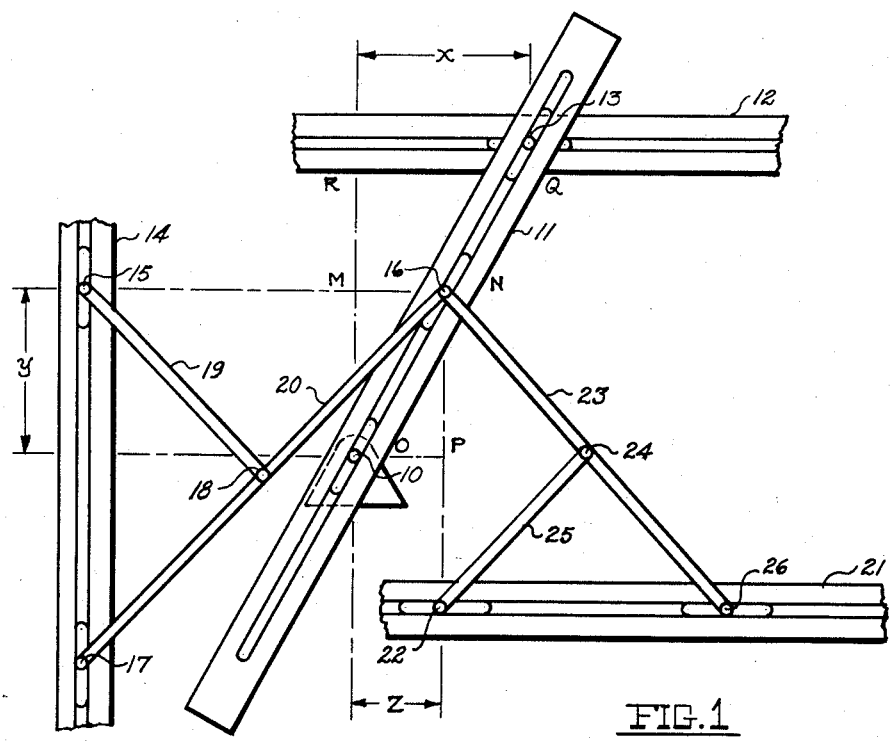
Figure 2:
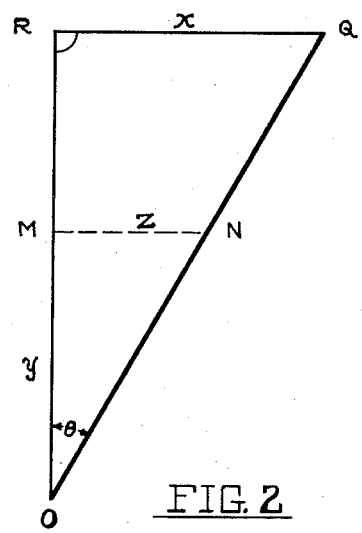

These and other advantasge, features and objects of the invention will become more apparent from the following description taken in connection with the illustrative embodiment in the accompanying drawings, wherein:

Fig. 1 is an illustrative schematic diagram of a precision linkage for exact multiplication; and Fig. 2 is a diagrammatic illustration of the principle of the invention of Fig. 1.

In Fig. 1 elements 14 through 20 comprise a modified Scott Russell linkage and differ from a true Scott Russell linkage in that pivot 15 has been made slidable. The modification allows a linear displacement of sliding pivot 15 in fixed guide 14 to be transmitted accurately to sliding pivot 16.

The precision linkage of Fig. 1 produces the exact product of $x$ and $y$ inputs as $z$. A fixed pivot 10 to which rotating slide 11 is slidably attached represents the zero point from which the $x$ and $y$ inputs and the $z$ output are measured. The $x$ input comprises a fixed guide 12 in which a sliding pivot 13, which is also slidably attached to slide 11, operates, while the $y$ input and $z$ output comprise a pair of modified Scott Russell linkages attached to a common slidable pivot 16 in slide 11. The $y$ input comprises a fixed guide 14 perpendicular to fixed guide 12 with a sliding pivot 15. The motion of pivot 15 is transmitted to sliding pivot 16 by means of a slidable pivot 17 in fixed guide 14 which is connected to sliding pivot 16 by means of link 20 whose center point contains a pivot 18 for link 19 which joins pivot 18 with sliding pivot 15. The position of pivot 16 determines the output $z$ and is transferred to sliding pivot 22 in fixed guide 21, which is perpendicular to fixed guide 14, by means of a second modified Scott Russell linkage comprising a slidable pivot 26 in fixed guide 21 which is connected to sliding pivot 16 by means of link 23 whose center point contains a pivot 24 for link 25 which joins pivot 24 with sliding pivot 22.

The principle or geometry of the device may be explained by referring to Figures 1 and 2. Guides 12 and 21 are parallel, and, for the purpose of this explanation, are deemed horizontal. Guide 14, perpendicular to guides 12 and 21, is designated as vertical. Points O, N, and Q form a straight line due to the guiding action of slide 11 and represent pivots 10, 16 and 13, respectively. OM is the vertical distance of pivot 15 from pivot 10, while OR is the vertical distance of slide 12 from pivot 10. OP represents the horizontal distance of pivot 22 from pivot 10. Thus, it can be seen that OR equals a constant which is unity. $MN=OP=z$ since pivot 16, because of the nature of the modified Scott Russell linkages, will always form a horizontal line with pivot 15 and a vertical line with pivot 22. $OM=y$; and $RQ=x$. From the trigonometric relationship of the parts, $$\text{Tangent } \theta = \frac{z}{y} = x$$

therefore, $z=xy$.

Although the invention has been described with reference to a particular embodiment, it will be understood to those skilled in the art that the invention is capable of a variety of alternative embodiments within the spirit and scope of the appended claims.

I claim:

1. An exact multiplier comprising first and second input guides at right angles to each other, an output guide parallel to said first input guide, a rotatable slide slidably pivoted to a fixed pivot and slidably pivoted to said first input guide by a pivot movable thereon, and a pair of linkages for connecting a common pivot in said rotatable slide with a slidable pivot in said second input guide and a slidable pivot in said output guide, respectively.

2. A multiplier as defined in claim 1 wherein each of said pair of linkages has the characteristic of transmitting movement of the pivot in its guide to said common pivot such that said common pivot lies on a perpendicular to the guide through the pivot in the guide.

3. In a linkage computer, a slide connected for both sliding and rotating movement about a fixed pivot, a pair of input guides, an output guide, a pivot slidably connected with one of said input guides and said slide, and linkage means pivotally connecting the other of said input guides and said output guide with said slide such that a line drawn between the connection of said linkage on said slide and a connection of said linkage on each of said guides is always perpendicular to said guides.

References Cited in the file of this patent

UNITED STATES PATENTS

| | | |
|---|---|---|
| 2,652,195 | Nickson | Sept. 15, 1953 |
| 2,652,978 | Pike | Sept. 22, 1953 |
| 2,716,521 | Brown | Aug. 30, 1955 |

FOREIGN PATENTS

| | | |
|---|---|---|
| 498,999 | Great Britain | Jan. 17, 1939 |